(12) United States Patent
Voglreiter et al.

(10) Patent No.: US 11,380,047 B2
(45) Date of Patent: Jul. 5, 2022

(54) METHODS AND APPARATUS FOR ORDER-INDEPENDENT OCCLUSION COMPUTATIONS

(71) Applicant: QUALCOMM Incorporated, San Diego, CA (US)

(72) Inventors: Philip Voglreiter, Graz (AT); Dieter Schmalstieg, Graz (AT); Markus Steinberger, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/894,643

(22) Filed: Jun. 5, 2020

(65) Prior Publication Data
US 2021/0383597 A1   Dec. 9, 2021

(51) Int. Cl.
*G06T 15/40* (2011.01)
*G06T 15/00* (2011.01)
*G06T 15/20* (2011.01)

(52) U.S. Cl.
CPC ............ *G06T 15/40* (2013.01); *G06T 15/005* (2013.01); *G06T 15/20* (2013.01)

(58) Field of Classification Search
CPC combination set(s) only.
See application file for complete search history.

(56) References Cited

U.S. PATENT DOCUMENTS

| 8,970,592 | B1* | 3/2015 | Petterson | G06T 13/60 345/427 |
| 10,074,210 | B1* | 9/2018 | Spencer | G06T 15/40 |
| 2008/0170066 | A1* | 7/2008 | Falchetto | G06T 15/40 345/419 |
| 2014/0362081 | A1* | 12/2014 | Cerny | G06T 15/40 345/426 |
| 2015/0123968 | A1* | 5/2015 | Holverda | G06T 15/40 345/422 |

(Continued)

OTHER PUBLICATIONS

Franke et al., "Multi-Layer Depth of Field Rendering with Tiled Splatting," May 2018, ACM on Computer Graphics and Interactive Techniques, vol. 1, Issue 1, pp. 1-17 (Year: 2018).*

(Continued)

*Primary Examiner* — Andrew G Yang
(74) *Attorney, Agent, or Firm* — Campbell C. Chiang; Procopio, Cory, Hargreaves & Savitch LLP

(57) ABSTRACT

The present disclosure relates to methods and apparatus for graphics processing. The apparatus can determine geometry information for each of a plurality of primitives associated with a viewpoint in a scene. The apparatus can also calculate at least one of surface information and disocclusion information based on the geometry information for each of the plurality of primitives, where the surface information and the disocclusion information may be associated with a volumetric grid based on a viewing area corresponding to the viewpoint. Also, the apparatus can calculate visibility information for each of the plurality of primitives based on at least one of the surface information and the disocclusion information, where the visibility information may be associated with the volumetric grid. The apparatus can also determine whether each of the plurality of primitives is visible based on the visibility information for each of the plurality of primitives.

36 Claims, 12 Drawing Sheets

(56) References Cited

U.S. PATENT DOCUMENTS

| | | | |
|---|---|---|---|
| 2015/0269770 A1* | 9/2015 | Jenkins | G06T 15/20 345/421 |
| 2016/0171745 A1 | 6/2016 | Silvennoinen et al. | |
| 2019/0213784 A1* | 7/2019 | Schmalstieg | G06T 15/405 |
| 2019/0259200 A1* | 8/2019 | Hoof | G06T 15/40 |

OTHER PUBLICATIONS

El-Sana J., et al., "Integrating Occlusion Culling with View-Dependent Rendering", Visualization 2001, [Annual IEEE Conference On Visualization], IEEE Computer Society Press, 10662 Los Vaqueros Circle Po Box 3014 Los Alamitos, CA 90720-1264 USA, Oct. 21, 2001 (Oct. 21, 2001), pp. 371-378, XP058283266, 9 Pages, ISSN: 1070-2385 abstract chapter: 1 "Introduction"; p. 371 chapters: 3 "Our Approach", 4 "Estimating Visibility", p. 373-p. 374 chapters : 6 "Implementation Details", 7 "Results"; p. 375-p. 376.
International Search Report and Written Opinion—PCT/US2021/031053—ISA/EPO—dated Feb. 2, 2022.
Schaufler G., et al., "Conservative Volumetric Visibility with Occluder Fusion", Computer Graphics, Siggraph 2000 Conference Proceedings, New Orleans, LA, Jul. 23-28, 2000, [Computer Graphics Proceedings Siggraph], New Yoirk, NY: ACM, us, Jul. 1, 2000 (Jul. 1, 2000) pp. 229-238, XP058374780, DOI: 10.1145/344779, 344886 ISBN 378-1-58113-208-3, figures 1-3, 5, 6, 10, 12 abstract chapter: 1 "Introduction"; p. 229 chapters: 3 "Definitions and Overview", 4 "2D Case", 5 "3D Case", pp. 230-233 chapter: 7 "Applications and Results", pp. 234-237.

\* cited by examiner

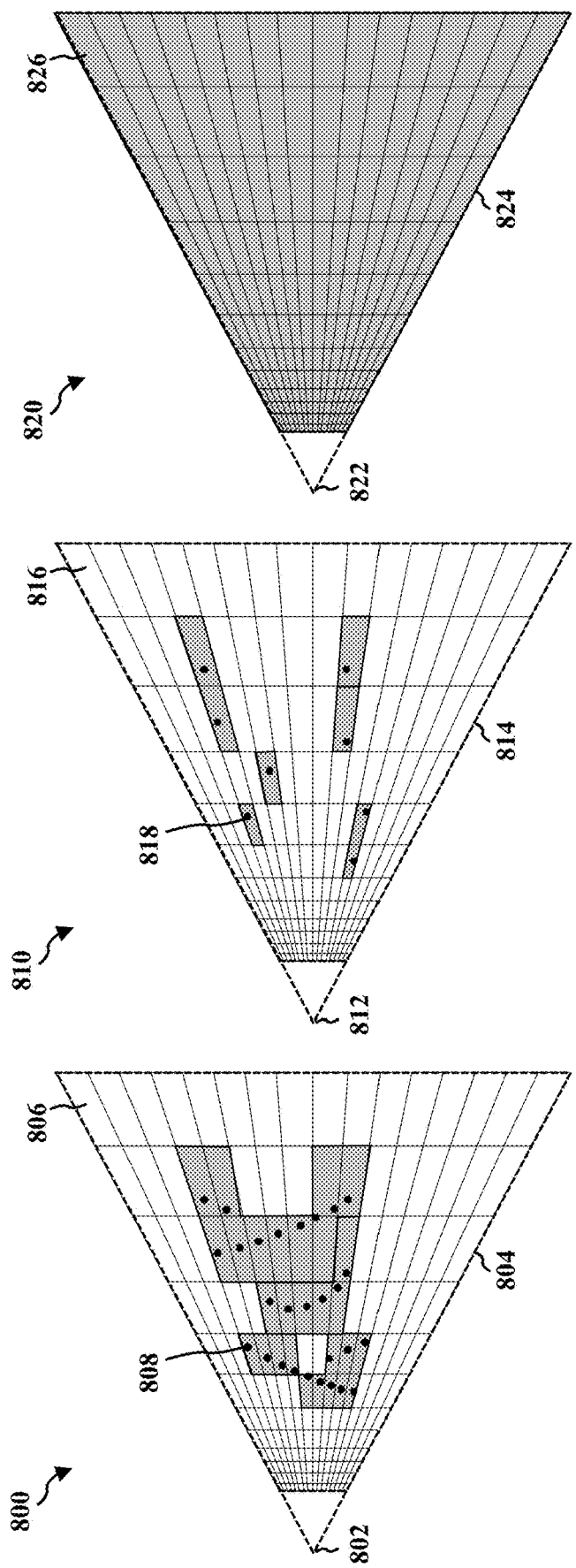

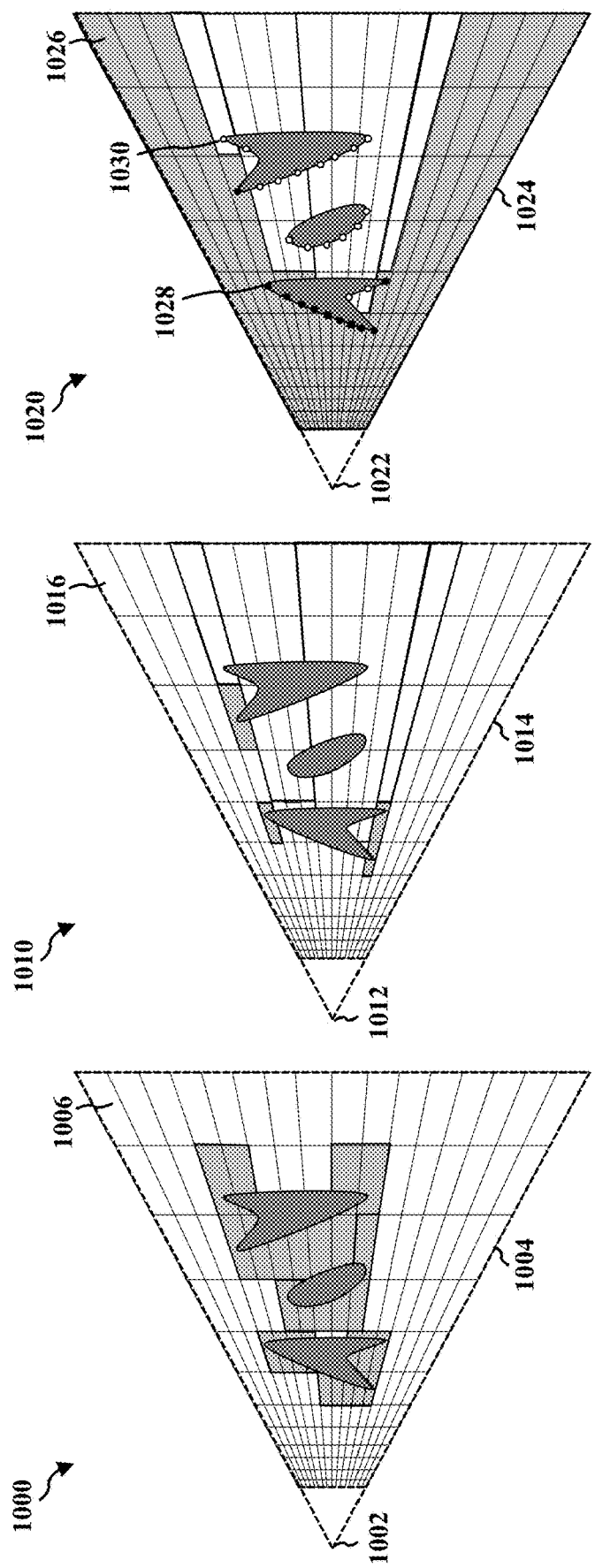

US 11,380,047 B2

METHODS AND APPARATUS FOR ORDER-INDEPENDENT OCCLUSION COMPUTATIONS

TECHNICAL FIELD

The present disclosure relates generally to processing systems and, more particularly, to one or more techniques for graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a graphics processing unit (GPU), a vertex shader, a fragment shader, a compute shader, or any apparatus that can perform graphics processing. The apparatus can generate a volumetric grid based on a viewing area corresponding to a viewpoint in a scene, where the volumetric grid may be associated with a surface buffer corresponding to surface information, a disocclusion buffer corresponding to disocclusion information, and a visibility buffer corresponding to visibility information. The apparatus can also generate the surface buffer including a plurality of surface cells, the disocclusion buffer including a plurality of disocclusion cells, and the visibility buffer including a plurality of visibility cells. The apparatus can also determine geometry information for each of a plurality of primitives associated with a viewpoint in a scene. Moreover, the apparatus can identify at least one of one or more surface fragments and one or more silhouette edges for each of the plurality of primitives based on the geometry information. The apparatus can also convert the geometry information for each of the plurality of primitives to at least one of the surface information and the disocclusion information. The apparatus can also calculate at least one of surface information and disocclusion information based on the geometry information for each of the plurality of primitives, where the surface information and the disocclusion information may be associated with a volumetric grid based on a viewing area corresponding to the viewpoint. Also, the apparatus can calculate visibility information for each of the plurality of primitives based on at least one of the surface information and the disocclusion information, where the visibility information may be associated with the volumetric grid. The apparatus can also store the surface information in the surface buffer, the disocclusion information in the disocclusion buffer, and the visibility information in the visibility buffer. The apparatus can also determine whether each of the plurality of primitives is visible based on the visibility information for each of the plurality of primitives. Additionally, the apparatus can store the visibility information for each of the plurality of primitives determined to be visible, where the visibility information may be stored as potentially visible set (PVS) information. The apparatus can also render at least one image including each of the plurality of primitives determined to be visible.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 8A-8C illustrate example diagrams including a viewing area and volumetric grid in accordance with one or more techniques of this disclosure.

FIGS. 10A-10C illustrate example diagrams including a viewing area and volumetric grid in accordance with one or more techniques of this disclosure.

DETAILED DESCRIPTION

Figure 1:
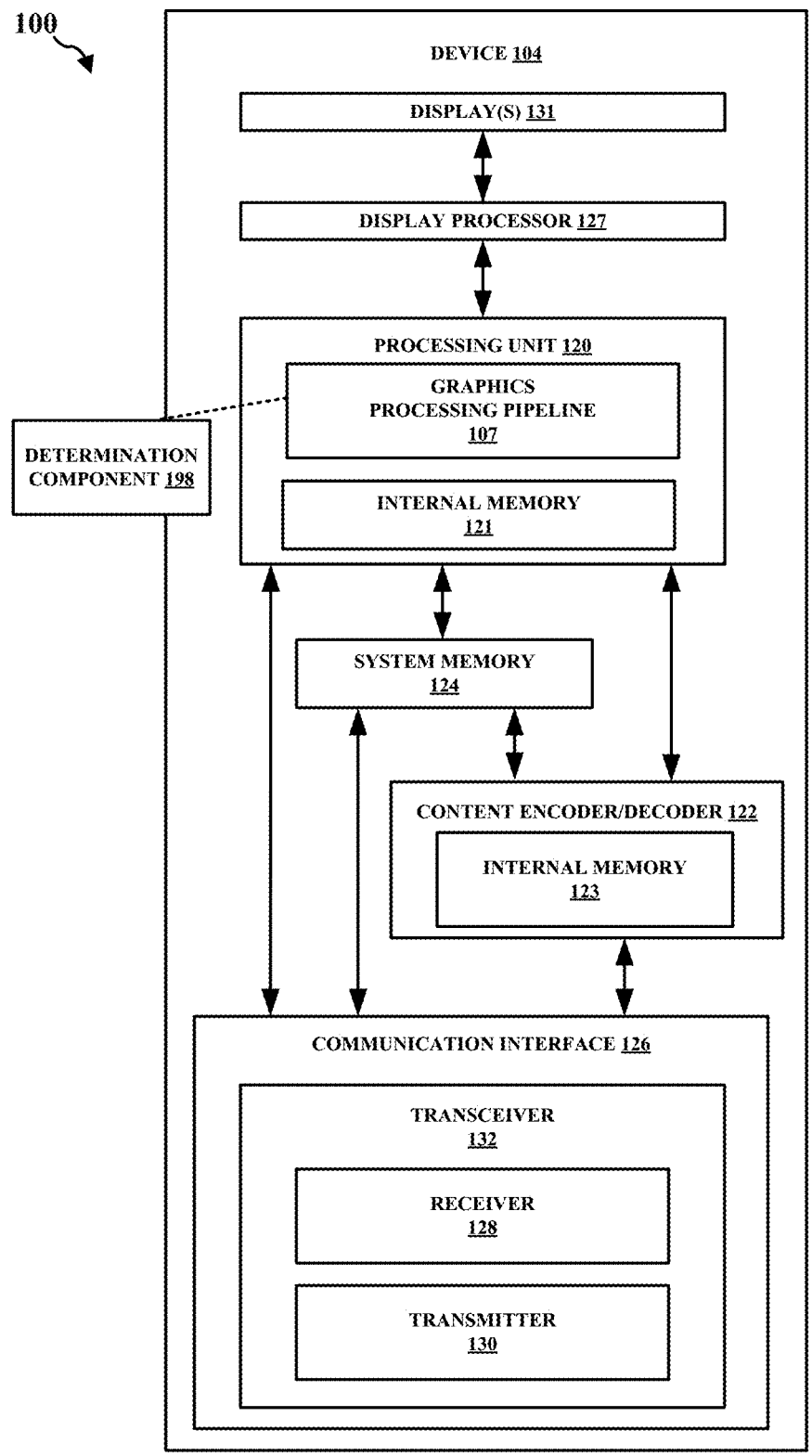
FIG. 1 is a block diagram that illustrates an example content generation system in accordance with one or more techniques of this disclosure.

Visibility computations may sort an entire scene geometry, such as via a trim region. For example, pre-sorting can be performed on a layer-by-layer basis in a trim region. Such sorting can be achieved on objects, in buckets, or as a per-fragment linked list. Multiple passes may be needed to handle the objects and perform the sorting on these objects. Based on this, the sorting process may become a bottleneck of a graphics system. As a result, the number of occlusions stacked along the line of sight may be limited, or more passes may be needed. In order to determine which objects may be visible in the near future, some methods can trim away the boundary of currently visible objects in order to determine which objects may be visible behind these objects. This future visibility can be based on a slight movement of the camera or scene with the objects. In some instances, the trim regions, i.e., regions in object space where disocclusions are enforced, can be stored as image-space extrusions with a fixed distance between a front and a back plane. However, trim region depth can also be a fixed size, which may not be efficient enough to save time or memory. Aspects of the present disclosure can utilize an efficient approach to determining visibility computations or a potentially visible set (PVS). For instance, aspects of the present disclosure may not need to sort geometry for an entire scene in order to compute the visibility computation. Some approaches herein, e.g., a visibility volume approach, can directly use a perspective 3D grid defined in eye-space, rather than sorting lists of trim regions. This can provide a volumetric or geometric representation of the entire scene or extended view frustum. For instance, the volume can be captured with multiple volumetric buffers, e.g., three 3D volumetric buffers. Each entry in the buffers may utilize a single bit, which can make the approach memory efficient.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to generate a volumetric grid based on a viewing area corresponding to a viewpoint in a scene, where the volumetric grid may be associated with a surface buffer corresponding to surface information, a disocclusion buffer corresponding to disocclusion information, and a visibility buffer corresponding to visibility information. The determination component 198 can also be configured to generate the surface buffer including a plurality of surface cells, the disocclusion buffer including a plurality of disocclusion cells, and the visibility buffer including a plurality of visibility cells. The determination component 198 can also be configured to determine geometry information for each of a plurality of primitives associated with a viewpoint in a scene. The determination component 198 can also be configured to identify at least one of one or more surface fragments and one or more silhouette edges for each of the plurality of primitives based on the geometry information. The determination component 198 can also be configured to convert the geometry information for each of the plurality of primitives to at least one of the surface information and the disocclusion information. The determination component 198 can also be configured to calculate at least one of surface information and disocclusion information based on the geometry information for each of the plurality of primitives, where the surface information and the disocclusion information may be associated with a volumetric grid based on a viewing area corresponding to the viewpoint. The determination component 198 can also be configured to calculate visibility information for each of the plurality of primitives based on at least one of the surface information and the disocclusion information, where the visibility information may be associated with the volumetric grid. The determination component 198 can also be configured to store the surface information in the surface buffer, the disocclusion information in the disocclusion buffer, and the visibility information in the visibility buffer. The determination component 198 can also be configured to determine whether each of the plurality of primitives is visible based on the visibility information for each of the plurality of primitives. The determination component 198 can also be configured to store the visibility information for each of the plurality of primitives determined to be visible, where the visibility information may be stored as potentially visible set (PVS) information. The determination component 198 can also be configured to render at least one image including each of the plurality of primitives determined to be visible.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may change the corresponding context. Additionally, the workload that corresponds to the mode or state may follow the changing mode or state.

Figure 2:
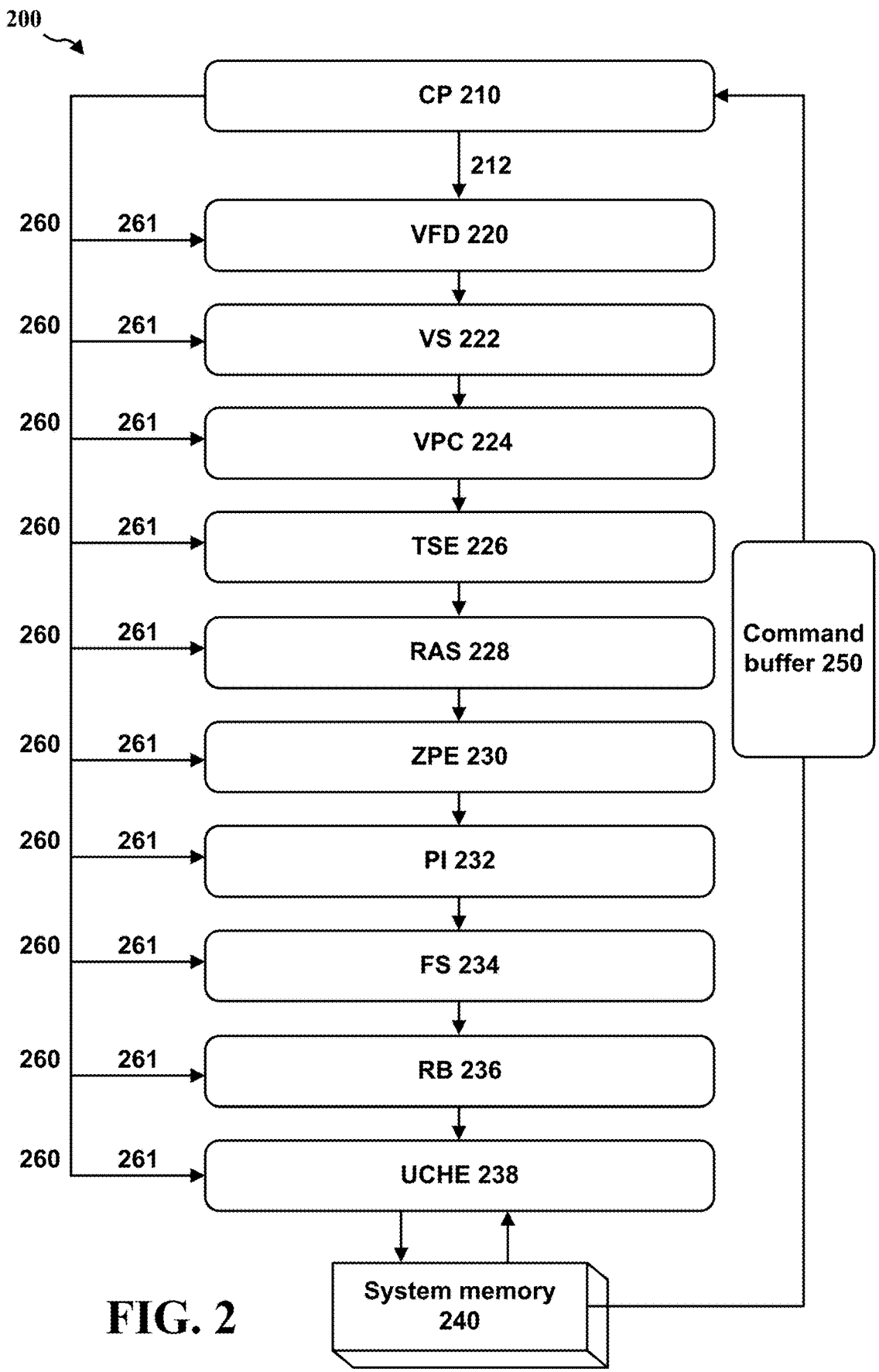
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitives in each bin or area, e.g., in a system memory. This visibility information can be used to determine or generate a visibility stream. In a rendering pass, the primitives in each bin can be rendered separately. In these instances, the visibility stream can be fetched from memory used to drop primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
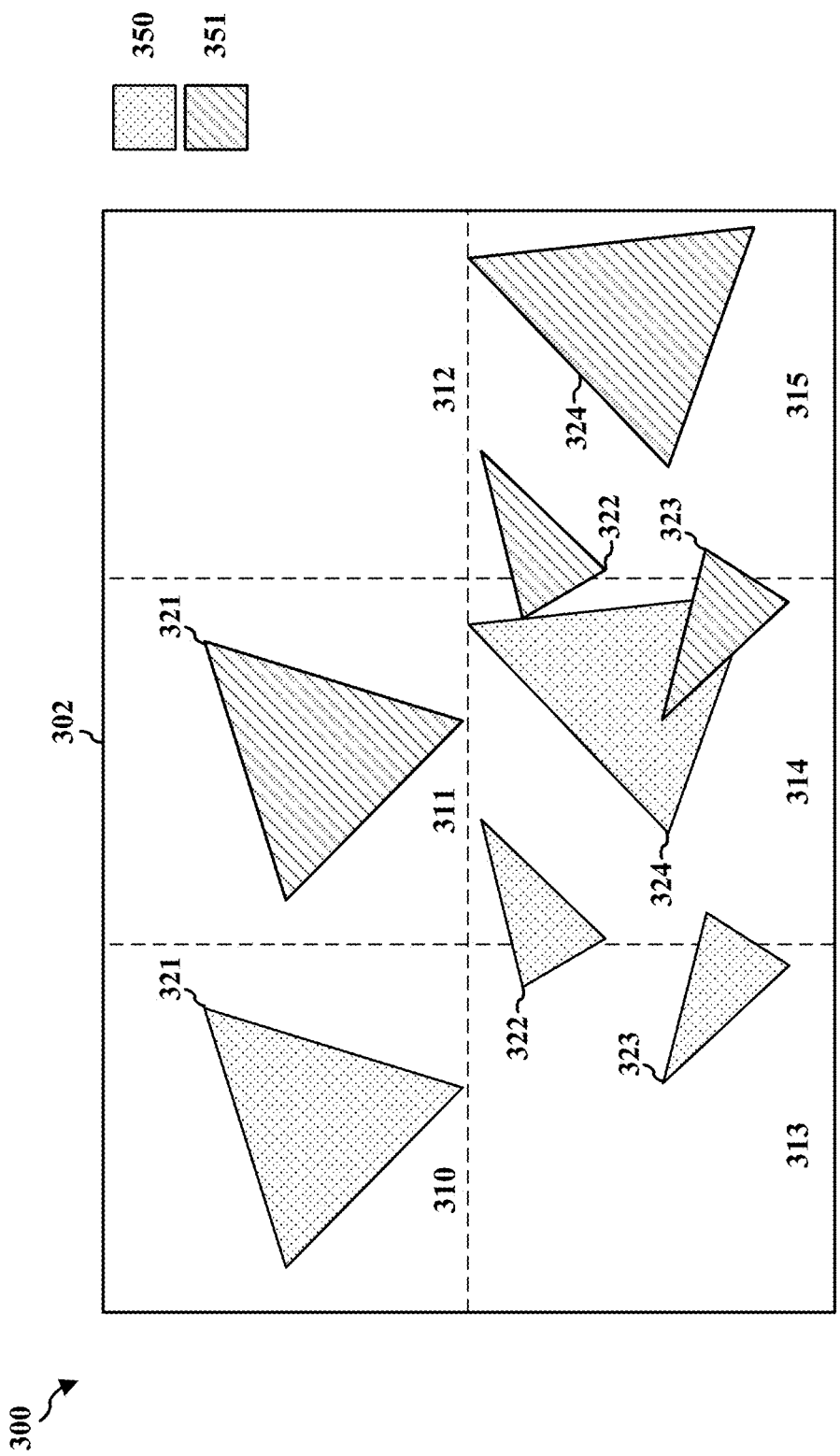
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processor units can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GPU internal memory (GMEM) at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In bin or tiled rendering, a small portion of the memory can be stored at the GPU, e.g., at the GMEM. In some instances, storing data at the GMEM may utilize a larger processing workload and/or power consumed compared to storing data at the frame buffer or system memory.

In some aspects, GPUs can perform a tessellation or tessellation process. During a tessellation process, larger primitives can be divided into smaller sub-primitives or tessellated primitives. Tessellation can divide an image into more detailed sub-primitives or tessellated primitives, which can lead to a more detailed rendering process and more detailed graphical content. A tessellator can determine or generate the sub-primitives or tessellated primitives. In some aspects, one or more primitives can be grouped into a patch. A tessellator can then determine or generate a geometry-based tessellation of the patch, e.g., using triangles or rectangles, according to one or more tessellation parameters.

The tessellation process can allow for determining or generating a more detailed or smoother image or surface than would otherwise be generated based on the original patch of primitives. Additionally, tessellation can be used for implementing or rendering more detailed surfaces in an image. As mentioned above, the tessellation process can produce sub-primitives or tessellated primitives. These sub-primitives or tessellated primitives are generated as an output from the tessellation, e.g., based on one or more primitives or patches. These primitives can also be referred to as original or regular primitives, which are generated based on the original image or surface value. The determined or generated sub-primitives or tessellated primitives can be a more detailed version of the original primitive or patch. In some instances, each of the sub-primitives can be smaller than each of the primitives or patch. Accordingly, the original primitives may appear to be divided into the sub-primitives or tessellated primitives.

Figure 4:
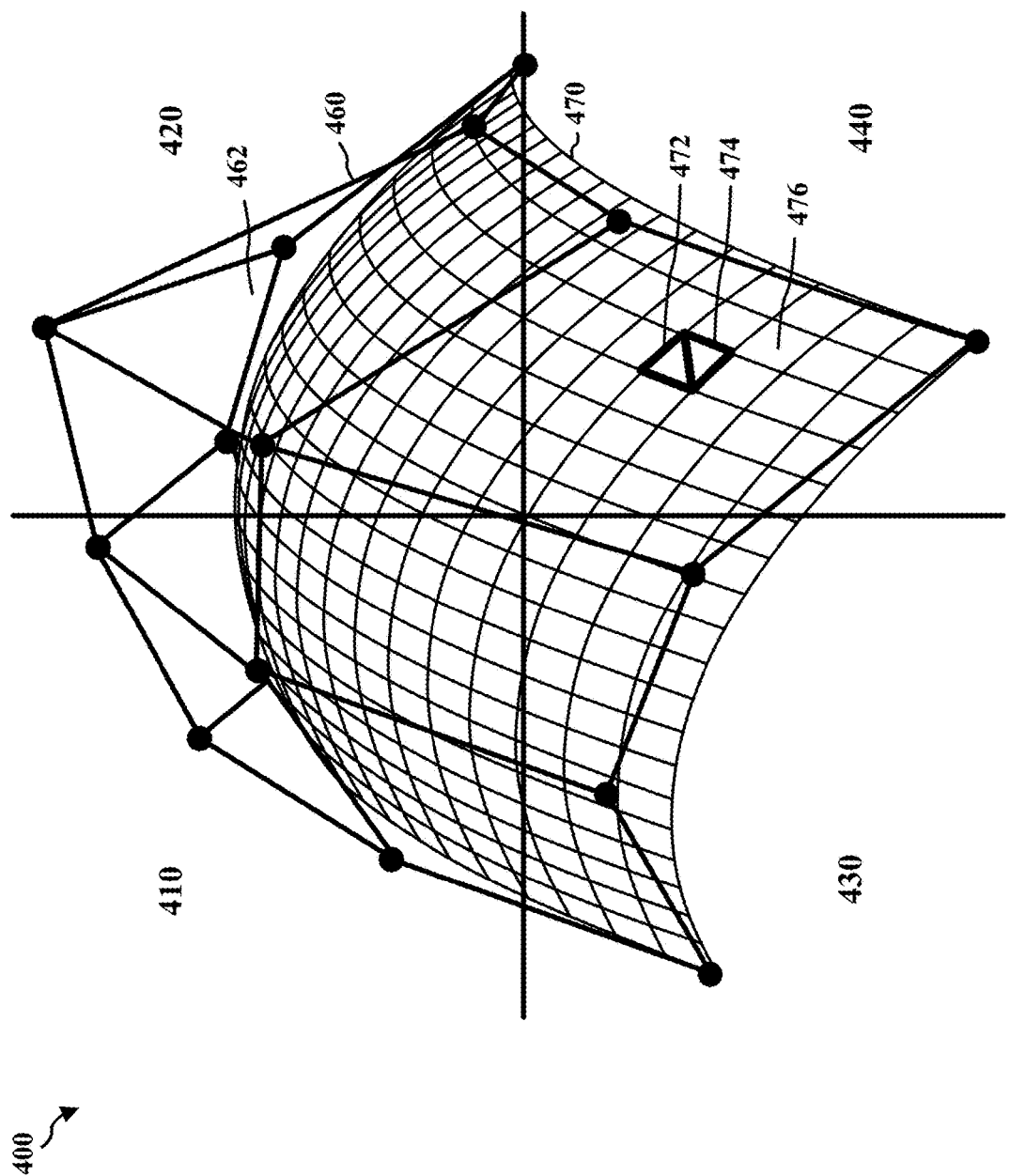
FIG. 4 illustrates an example image or surface in accordance with one or more techniques of this disclosure.

FIG. 4 illustrates an example image or surface 400 in accordance with one or more techniques of this disclosure. FIG. 4 illustrates that the image 400 is divided into multiple bins, e.g., bin 410, bin 420, bin 430, and bin 440. Also, FIG. 4 displays patch 460 which includes one or more primitives 462. In some aspects, patch 460 can be referred to as a group of primitives or one or more primitives. FIG. 4 also displays a plurality of sub-primitives 470 which includes sub-primitive 472, sub-primitive 474, and sub-primitive 476. As shown in FIG. 4, the individual sub-primitives in the plurality of sub-primitives 470 can be a number of different shapes such as rectangles, e.g., sub-primitive 476, or triangles, e.g., sub-primitives 472, 474.

FIG. 4 displays an example of the aforementioned tessellation process. For example, the original or input primitives, e.g., one or more primitives 462 in patch 460, are displayed as the larger triangles with the dots as vertices. The sub-primitives or tessellated primitives, e.g., sub-primitives 470, that are output from the tessellation process are displayed as the smaller rectangles or triangles on the surface 400, e.g., sub-primitives 472, 474, 476.

For a streaming rendering approach, such as client-server rendering, graphics processing systems can determine a potentially visible set (PVS) of triangles or primitives that may become visible under small camera movements. This information can be sent to a client device, so the client can have all of the geometry available for rendering. In some aspects, a client may use those triangles or primitives to render a new view for an updated head position. The identification of the PVS may be highly efficient and may need as little additional information as possible, such as to avoid any complex data structures and sorting objects.

In order to determine which objects may be visible in the near future, some methods can trim away the boundary of currently visible objects in order to determine which objects may be visible behind these objects, i.e., via a trim region. This future visibility can be based on a slight movement of the camera or scene with the objects. In some aspects, visibility computations may sort an entire scene geometry, such as via a trim region PVS. For example, pre-sorting can be performed on a layer-by-layer basis in a trim region PVS. Such sorting can be achieved on objects, in buckets, or as a per-fragment linked list. Multiple passes may be needed to handle the objects and perform the sorting on these objects. Based on this, the sorting process may become a bottleneck of a graphics system. As a result, the number of occlusions stacked along the line of sight may be limited, or more passes may be needed.

In some instances, the trim regions, i.e., regions in object space where disocclusions are enforced, can be stored as image-space extrusions with a fixed distance between a front and a back plane. So trim regions can be stored as surface information using a front and a back plane. Accordingly, there is a present need to utilize an efficient approach to determining visibility computations or a PVS, such as without the need to sort geometry for an entire scene.

Aspects of the present disclosure can utilize an efficient approach to determining visibility computations or a PVS. For instance, aspects of the present disclosure may not need to sort geometry for an entire scene in order to compute the visibility computation. Some approaches herein, e.g., a visibility volume approach, can directly use a perspective 3D grid defined in eye-space, rather than sorting lists of trim regions. This can provide a volumetric or geometric representation of the entire scene or extended view frustum. For instance, the volume can be captured with multiple volumetric buffers, e.g., three 3D volumetric buffers. Each entry in the buffers may utilize a single bit, which can make the approach memory efficient.

In some aspects, identifying a potential visible set (PVS) can be completed in three passes, and independent of the number of objects or occlusions in the scene. For instance, two passes can utilize conventional rasterization, one pass iterates over volumetric buffers in a screen-space, such as a deferred rendering pass or a compute shader pass, where one pass can be an efficient, hardware supported propagation through the volumetric buffers. Also, the volumetric buffers can make the approach order-independent, such that the order in which objects are submitted to the render processor is irrelevant. Unlike other methods, which may rely on a front-to-back sorting, objects in the method of the present disclosure can be submitted to the graphics processor in an arbitrary order. The output of such approaches can be a set of potentially visible triangles for a set of camera or scene movements.

As mentioned previously, other methods may place equally-sized trim regions at arbitrary locations in object space, such that all trim regions may have the same depth in view or object space independent of their distance to the camera. However, the trim region's depth, i.e., its extent along a ray facing away from the viewpoint, may depend on the distance from the camera. Due to perspective foreshortening, objects that are further away may be represented with coarser geometry, and, thus, their features may cover a larger depth interval. Moreover, depth resolution can decrease with distance, so object features may be further apart in order to be discriminated. Aspects of the present disclosure can replace these trim regions with a perspective 3D volumetric grid.

Additionally, visibility volume approaches of the present disclosure can adjust to the distance to the camera in the scene. The depth of a cell may increase non-linearly with a distance z to the camera or viewpoint, e.g., using $1/z$ for the trim size in z and/or log z. This depth adjustment can identify how deep the individual cells may be in each of the buffers. Visibility volumes approaches herein can also quantize space in the image domain (x-y) and in the depth domain (z). Due to the nonlinear z spacing, the number of grid cells in the z direction may be reasonably bounded, e.g., 64, 128, or 256 cells. This can be dissimilar to the aforementioned trim regions, which may be freely placed in object space and consequently need complex intersection tests.

In some instances, using a 3D quantization, visibility cells may be small and fine-grained in the front of the grid closer to the camera or viewpoint, i.e., where a high amount of detail is present so more information bits may be needed, and coarse and wide in the back of the grid farther away from the camera or viewpoint, i.e., where geometric detail naturally decreases so less bits are needed. By doing so, the present disclosure may not utilize much information in the depth dimension. Also, as single bits may be utilized for each cell in the buffers, the amount of bits utilized may be reduced.

Figure 5B:
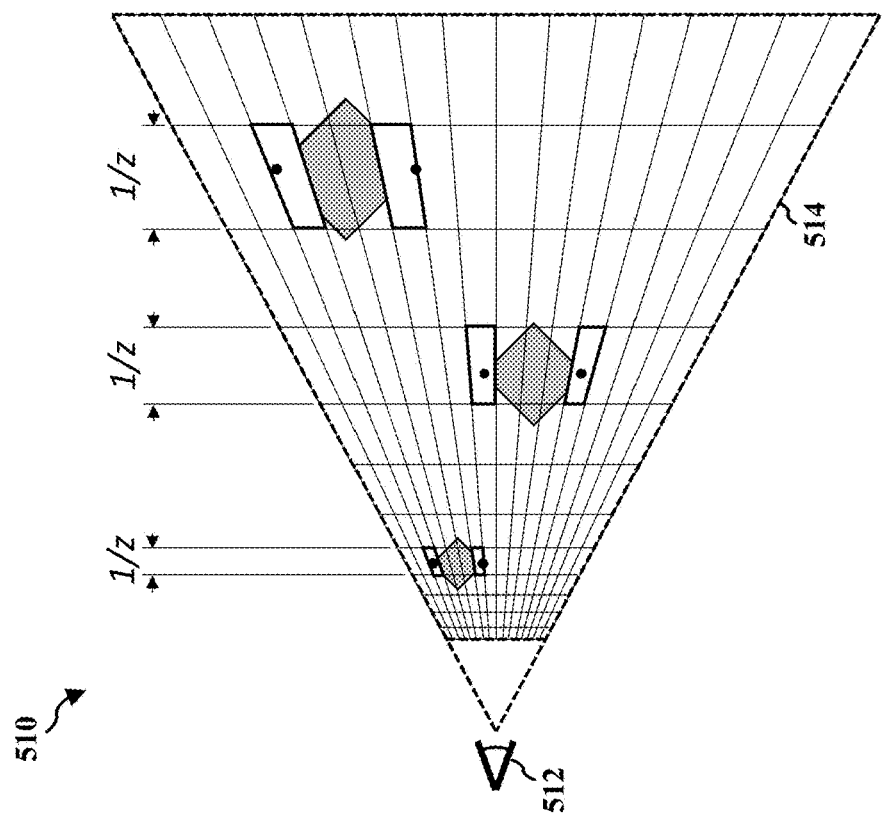
FIGS. 5A and 5B illustrate example diagrams including a viewing area in accordance with one or more techniques of this disclosure.
Figure 5A:
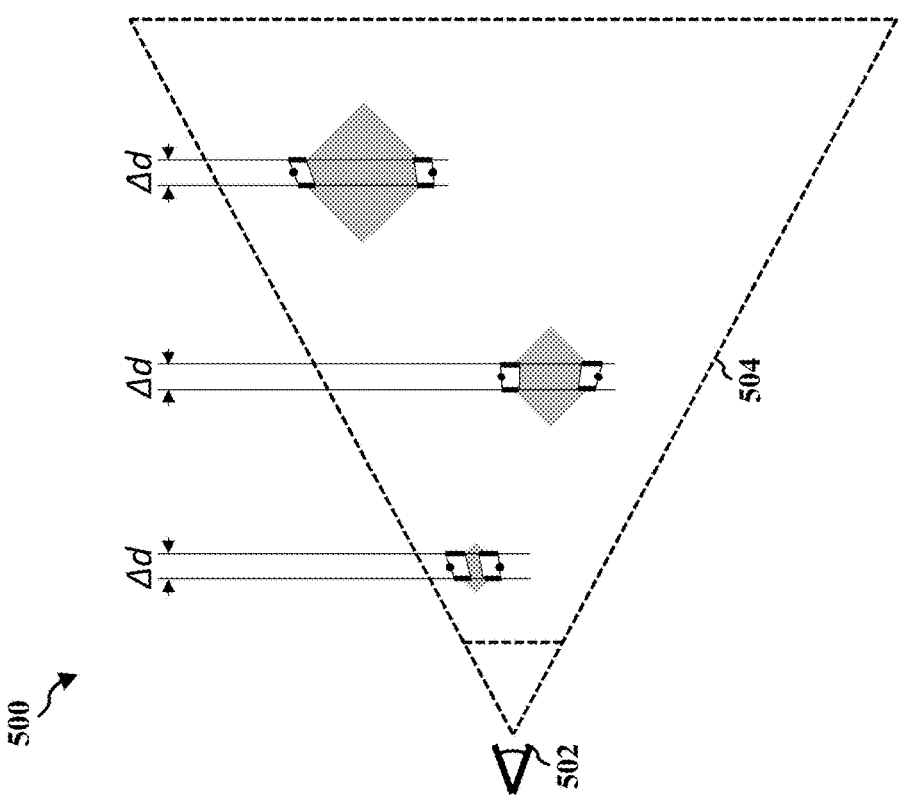

FIGS. 5A and 5B illustrate example diagrams 500 and 510, respectively, including a viewing area in accordance with one or more techniques of this disclosure. As shown in FIG. 5A, diagram 500 includes a viewpoint or camera 502 and a viewing area 504. FIG. 5A illustrates the aforementioned trim regions approach for occlusion and visibility computations. As shown in FIG. 5B, diagram 510 includes a viewpoint or camera 512 and a viewing area 514. FIG. 5B illustrates the bit visibility volume approach of the present disclosure for order-independent occlusion and visibility computations.

As shown in FIG. 5B, the cells can have a reduced depth closer to the camera 512, and farther away from the camera 512 there can be increased depth. This is because objects closer to the camera 512 are in more detail. Objects farther away from the camera 512 can include larger trimmed regions. The present disclosure can identify silhouettes to determine where geometry can be trimmed. To mark the trimming, the present disclosure can use a volumetric buffer and indicate a potential trim volume in one of the buffers. So aspects of the present disclosure can identify a trim region in a buffer that can identify which objects may be potentially visible behind the object. Also, FIG. 5B may be represented by a number of bits in the buffer, e.g., 6 bits.

Due to quantization, aspects of the present disclosure can utilize a dense visibility representation with individual bits. As indicated herein, the present disclosure can use three buffers: a surface buffer (S or s_buffer), a disocclusion buffer (D or d_buffer), and a visibility buffer (V or v_buffer). Each of these buffers can utilize one bit per cell in the buffer. As such, there can be one bit per cell to indicate disocclusions in the d_buffer, one bit per cell to indicate surfaces in the s_buffer, and one bit per cell to indicate visibility in the v_buffer. So the present disclosure can utilize a number of bits, e.g., 64 or 128 bits, to represent each of the three buffers.

Each of the surface buffer, the disocclusion buffer, and the visibility buffer can also correspond to a volumetric grid in perspective space. These volumetric grids can be encoded with limited bits, e.g., 1 bit per cell in the grid. In some aspects, visibility can be fine grained in the x-y space and can be more coarse grained in the z space. Thus, the present disclosure can use a compact multi-bit representation in the z space and full screen-space resolution in the x-y space, as well as use a fraction of the full screen width and height. For example, the present disclosure can use three screen-sized buffers with 128 bits each, i.e., four unsigned 32-bit integers. So for every pixel, the present disclosure can store a 128 bit value. As such, a complete volumetric representation can correspond to 128 bits for each view ray in a buffer.

Figure 6C:
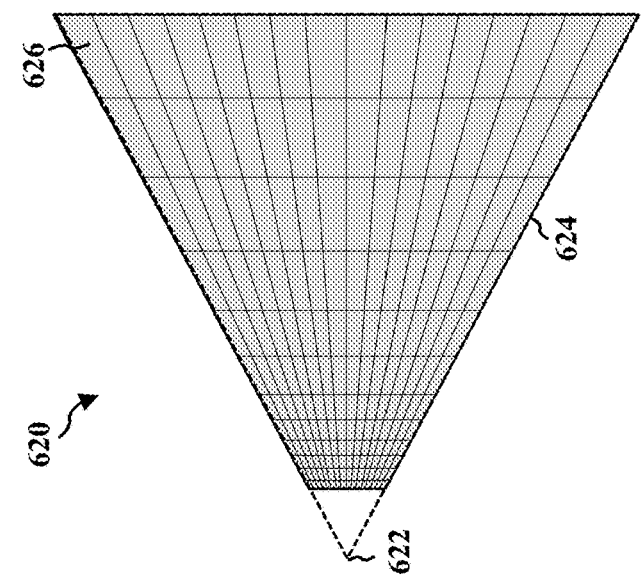
FIGS. 6A-6C illustrate example diagrams including a viewing area and volumetric grid in accordance with one or more techniques of this disclosure.
Figure 6B:
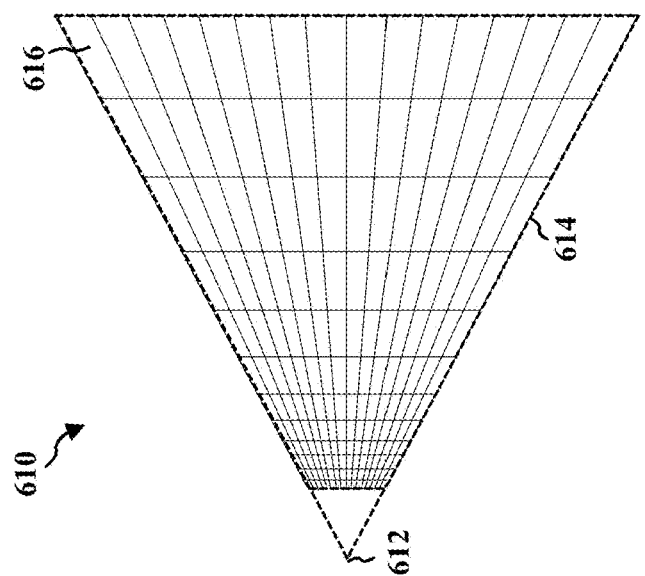
Figure 6A:
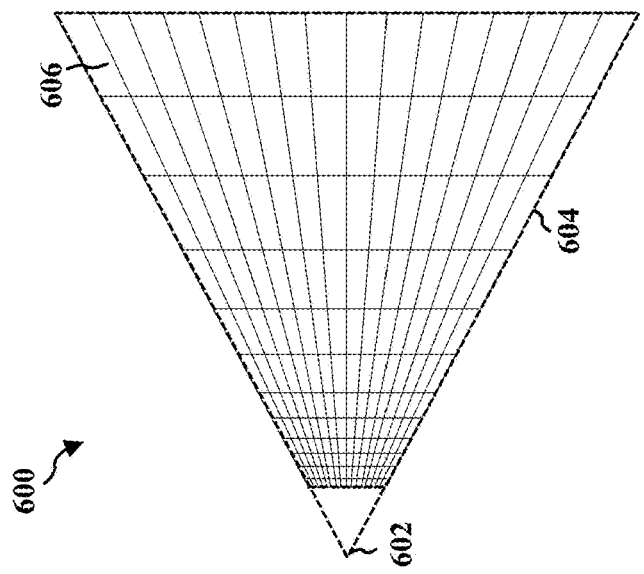

FIGS. 6A-6C illustrate example diagrams 600, 610, and 620, respectively, including a viewing area and volumetric grid in accordance with one or more techniques of this disclosure. As shown in FIG. 6A, diagram 600 includes viewpoint or camera 602, viewing area 604, and volumetric grid 606. As shown in FIG. 6B, diagram 610 includes viewpoint or camera 612, viewing area 614, and volumetric grid 616. As shown in FIG. 6C, diagram 620 includes viewpoint or camera 622, viewing area 624, and volumetric grid 626. Volumetric grid 606 can correspond to the surface buffer, volumetric grid 616 can correspond to the disocclusion buffer, and volumetric grid 626 can correspond to the visibility buffer.

Aspects of the present disclosure can utilize a visibility algorithm, which can include the aforementioned buffers and a number of passes. As shown in FIGS. 6A-6C, the present disclosure can clear the s_buffer and d_buffer and set the bit values of each cell to zero, as well as set the bit values of each cell in the v_buffer to 1. Accordingly, diagrams 600 and 610 include bit values of zero for each cell in the surface buffer and the disocclusion buffer, respectively. Also, diagram 620 includes bit values of one for each cell in the visibility buffer.

In a first pass of a visibility algorithm, the present disclosure can perform a silhouette identification. The present disclosure can calculate the entire scene geometry once, ignoring order, and detect silhouettes or silhouette edges. Front facing triangles adjacent to a silhouette can be marked in fragment processing for disocclusion by writing to the d_buffer. Silhouettes may be the points at which silhouette edges are detected, which can correspond to the point at which a front-facing triangle meets a back-facing triangle. These can be the points where the present disclosure may seek to trim the edges of objects, as an object behind this object may be visible in the future.

Generated surface fragments can be written into the surface volume or s_buffer. Surface fragments can be normal fragments being generated when a sample of a pixel is pointing towards a camera, which can mean that the object is being rendered. So these are the fragments that are generated due to typical rendering. Fragments from marked triangles can be written into the d_buffer. Writing can mean setting bits in the buffers using bit-wise operations, blend operations, or logical atomic operations.

Figures 7A, 7B, 7C:
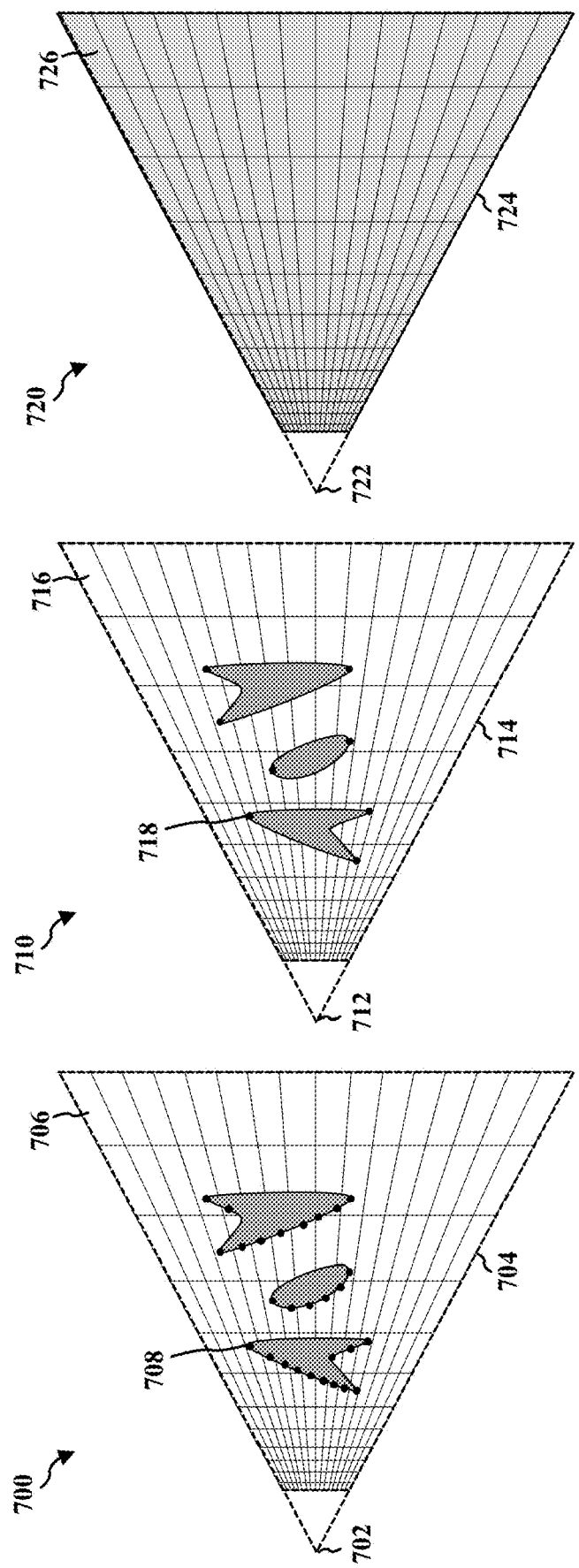
FIGS. 7A-7C illustrate example diagrams including a viewing area and volumetric grid in accordance with one or more techniques of this disclosure.

FIGS. 7A-7C illustrate example diagrams 700, 710, and 720, respectively, including a viewing area and volumetric grid in accordance with one or more techniques of this disclosure. As shown in FIG. 7A, diagram 700 includes viewpoint or camera 702, viewing area 704, and volumetric grid 706. As shown in FIG. 7B, diagram 710 includes viewpoint or camera 712, viewing area 714, and volumetric grid 716. As shown in FIG. 7C, diagram 720 includes viewpoint or camera 722, viewing area 724, and volumetric grid 726. Volumetric grid 706 can correspond to the surface buffer, volumetric grid 716 can correspond to the disocclusion buffer, and volumetric grid 726 can correspond to the visibility buffer.

FIG. 7A displays a number of surface fragments 708 which can be identified based on primitives or objects in a scene. These surface fragments 708 can correspond to locations in the volumetric grid 706. As mentioned above, the surface fragments 708 can correspond to the surface buffer. Also, FIG. 7B displays a number of silhouette edges 718 which can be identified based on primitives or objects in a scene. These silhouette edges 718 can correspond to locations in the volumetric grid 716. As mentioned above, silhouette edges 718 can correspond to the disocclusion buffer.

FIGS. 8A-8C illustrate example diagrams 800, 810, and 820, respectively, including a viewing area and volumetric grid in accordance with one or more techniques of this disclosure. As shown in FIG. 8A, diagram 800 includes viewpoint or camera 802, viewing area 804, and volumetric grid 806. As shown in FIG. 8B, diagram 810 includes viewpoint or camera 812, viewing area 814, and volumetric grid 816. As shown in FIG. 8C, diagram 820 includes viewpoint or camera 822, viewing area 824, and volumetric grid 826. Volumetric grid 806 can correspond to the surface buffer, volumetric grid 816 can correspond to the disocclusion buffer, and volumetric grid 826 can correspond to the visibility buffer.

FIG. 8A displays a number of surface fragments 808 which can be identified based on the primitives or objects in a scene in FIG. 7A. Surface fragments 808 correspond to cells in the volumetric grid 806 or s_buffer. Also, FIG. 8B displays a number of silhouette edges 818 which can be identified based on primitives or objects in a scene in FIG. 7B. Silhouette edges 818 correspond to cells in the volumetric grid 816 or d_buffer. FIGS. 8A-8C show that entries may be generated in the corresponding buffers, e.g., s_buffer, d_buffer, and v_buffer, which are based on actual objects. As shown in FIG. 8C, the v_buffer may not yet be marked at this point.

In a second pass, aspects of the present disclosure can perform a visibility propagation or visibility construction pass. This pass can propagate visibility information amongst the three buffers, e.g., s_buffer, d_buffer, and v_buffer. So the visibility construction pass can be where one thread is used for each x-y entry, e.g., via a screen-sized grid or compute shader. The present disclosure can move from front to back in terms of depth from the camera, and then write or propagate the results from the s_buffer and d_buffer into the v_buffer.

Each cell or thread in a buffer can include a visible state and a consumed state, e.g., visible=1 and consumed=0. When an entry is hit in the s_buffer or d_buffer, the consumed value can change to 1. If the visible value is 0 for a cell, such that the portion of a primitive or object corresponding to a cell is not visible, the present disclosure can set the visibility cells to 1 and the disocclusion cells to 0 from this point going away from the camera or viewpoint.

In some aspects, if the visible value is 1, such that the portion of a primitive or object corresponding to a cell is visible, the present disclosure can distinguish the cell values based on a number of cases. For instance, if a surface cell in the s_buffer is set (S=1) and a disocclusion cell in the d_buffer is not set (D=0), this can mean that an occluder is detected. In this case, the present disclosure can set a visible value to 0 for the remaining cells going away from the camera or viewpoint. So if there is a surface that has not been trimmed, this surface cannot be viewed through, so everything behind the surface will be marked as not visible.

Additionally, if a disocclusion cell in the d_buffer is set (D=1), a surface cell in the s_buffer is set (S=1), and a consumed cell for a view ray, thread, or pixel is not set (consumed=0), then a disocclusion may be active. In this case, the present disclosure can set consumed=1, and maintain a cell value of D=1. This may be a volumetric cell where there may be trimming. As the consumed flag is set to 0, this can mean that the algorithm is addressing a disocclusion for the first time along the view ray.

Also, if a disocclusion cell in the d_buffer is set (D=1), a surface cell in the s_buffer is set (S=1), and a consumed cell for a view ray, thread, or pixel is set (consumed=1), then the present disclosure may set a disocclusion cell value to D=0 and mark the next cell as visible=0. So once the consumed flag is set, the present disclosure can set the next cells away from the camera or viewpoint to 0. This operation can implement occludee shrinking. Moreover, if a visible value is set to 0 for a cell, the present disclosure can set the visibility cell in the v_buffer to 0 and the disocclusion cell in the d_buffer to 0 for the remaining cells going away from the camera or viewpoint.

Figures 9A, 9B, 9C:
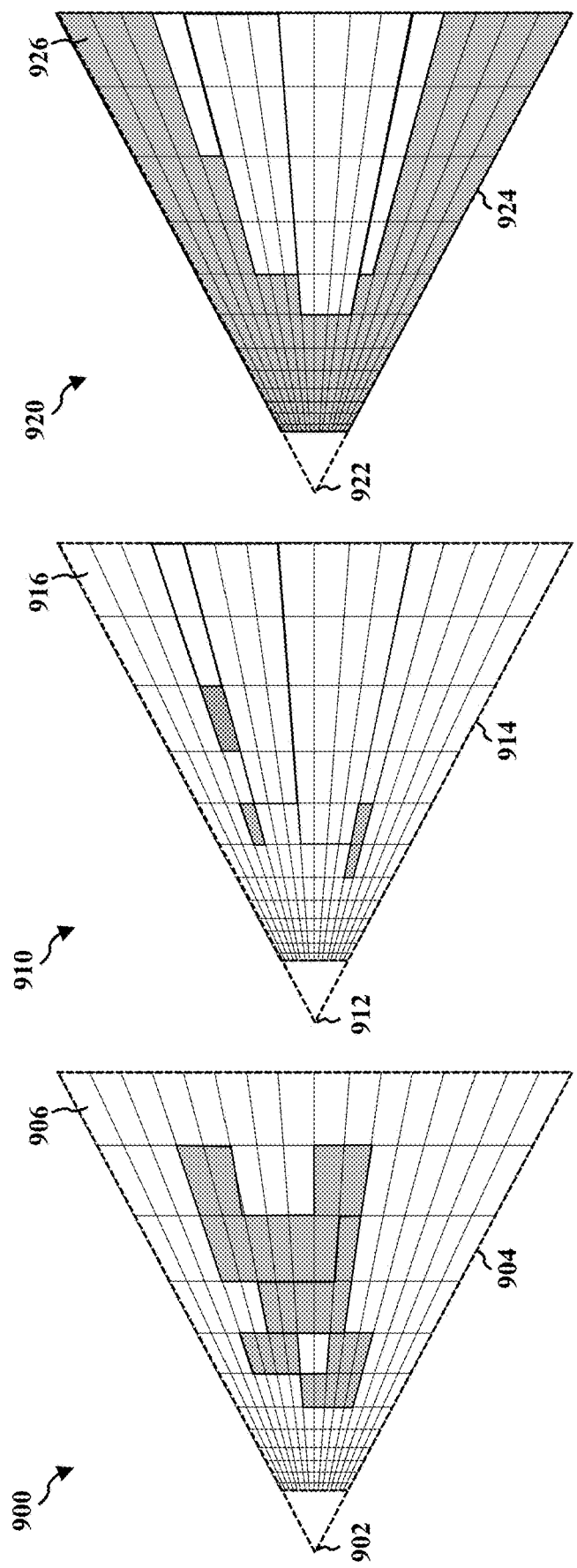
FIGS. 9A-9C illustrate example diagrams including a viewing area and volumetric grid in accordance with one or more techniques of this disclosure.

FIGS. 9A-9C illustrate example diagrams 900, 910, and 920, respectively, including a viewing area and volumetric grid in accordance with one or more techniques of this disclosure. As shown in FIG. 9A, diagram 900 includes viewpoint or camera 902, viewing area 904, and volumetric grid 906. As shown in FIG. 9B, diagram 910 includes viewpoint or camera 912, viewing area 914, and volumetric grid 916. As shown in FIG. 9C, diagram 920 includes viewpoint or camera 922, viewing area 924, and volumetric grid 926. Volumetric grid 906 can correspond to the surface buffer, volumetric grid 916 can correspond to the disocclusion buffer, and volumetric grid 926 can correspond to the visibility buffer.

FIGS. 9A-9C display the volumetric grid 906 for the surface buffer, volumetric grid 916 for the disocclusion buffer, and volumetric grid 926 for the visibility buffer after the aforementioned second pass of the visibility algorithm. As shown in FIGS. 9A-9C, each of the rows in the volumetric grids 906, 916, and 926 are a line of visibility going away from the viewpoints 902, 912, and 922, respectively. If each cell behind a cell is not visible, then the present disclosure can set the visibility cell in the v_buffer to 0 and skip the s_buffer and d_buffer for the rest of the row. As shown in volumetric grid 926 in FIG. 9C, each of the gray cells in the v_buffer may be marked as visible and each of the white cells in the v_buffer may be marked as not visible.

In a third pass, or final visibility pass, the geometry information can be calculated a second time. In some aspects, if the d_buffer or v_buffer cells are set for a rasterized fragment, the corresponding triangle may be visible. Also, if a cell in the v_buffer is set to visible, then the corresponding portion of the primitive can be identified as visible and added to the PVS or PVS information.

FIGS. 10A-10C illustrate example diagrams 1000, 1010, and 1020, respectively, including a viewing area and volumetric grid in accordance with one or more techniques of this disclosure. As shown in FIG. 10A, diagram 1000 includes viewpoint or camera 1002, viewing area 1004, and volumetric grid 1006. As shown in FIG. 10B, diagram 1010 includes viewpoint or camera 1012, viewing area 1014, and volumetric grid 1016. As shown in FIG. 10C, diagram 1020 includes viewpoint or camera 1022, viewing area 1024, and volumetric grid 1026. Volumetric grid 1006 can correspond to the surface buffer, volumetric grid 1016 can correspond to the disocclusion buffer, and volumetric grid 1026 can correspond to the visibility buffer.

FIG. 10C displays a number of visible vertices or visible fragments 1028 and invisible vertices 1030 which can be identified based on the visibility information in FIG. 9C. Both visible vertices 1028 and invisible vertices 1030 can correspond to cells in the volumetric grid 1026 or v_buffer. In FIG. 10C, the visible vertices 1028 are black and the invisible vertices 1030 are white. As shown in FIG. 10C, the visible vertices 1028 corresponding to the object or primitive closest to viewpoint 1022 can be identified as visible and added to the PVS. The invisible vertices 1030 corresponding to the objects or primitives farthest away from viewpoint 1022, which are behind the object closest to viewpoint 1022, may be identified as not visible, and may not be added to the PVS. As shown in FIGS. 10A-10C, once the propagation of information from the buffers is completed, the v_buffer can be queried, and the s_buffer and d_buffer may no longer be queried.

In some aspects, a consumed flag can be used to reveal a single disocclusion. As indicated above, the consumed flag can correspond to the edges or silhouettes of multiple objects or primitives. So if an object edge is behind another object edge, it is unlikely that anything behind this may be visible. This can be associated with the process of occludee shrinking.

Aspects of the present disclosure can also include visibility depth intervals. In these instances, a disocclusion may fall immediately after or before the next quantization step in z, and thus not propagate its information properly along z. Aspects of the present disclosure can set multiple cell bits (both current and after) to include them in case the fragment is too close to a quantization step. So this can be an adjustment to identify nearby cells as disocclusions or as visible, e.g., set the cell bit value to 1, if the cell is close to another visible cell.

In some aspects, using entire triangles to write to the d_buffer can be wasteful, as there may be a need to write around the silhouette. Instead, the present disclosure can compute the distance of the non-silhouette vertex to the silhouette in screen space and set the distance of the other vertices to 0. The attribute interpolation of the rasterizer may provide the distance for each fragment. So fragments with a distance less than or equal to a specific distance may write to the d_buffer. Disocclusions in some methods can rely on the quantization in x-y and the triangle size. As an improvement, the present disclosure can choose the x-y quantization, i.e., the buffer resolution or image resolution, to correspond to the supported camera movement. In some aspects, the generated triangles may be too small to be sampled in the first pass and are missing from the d_buffer. Aspects of the present disclosure can include a number of alternatives for the implementation of such a behavior. For instance, the present disclosure can write to multiple buffer locations during primitive processing or use conservative rasterization to generate fragments for small triangles and write to multiple x-y samples during fragment processing. Also, the present disclosure can generate geometry around silhouettes that capture the supported camera movement and write into the d_buffer.

Aspects of the present disclosure can reuse the s_buffer as the v_buffer, and thus may utilize two buffers rather than three buffers. Additionally, the algorithm herein can use efficient bit operations in the second pass and may not utilize a loop. The present disclosure can utilize a find first set (ffs) bit operation to find the first combination of the d_buffer and the s_buffer, i.e., ffs(D&S), where '&' is a bitwise 'and.' Also, the present disclosure can clear the first found bit and perform the same operation to consider the consumed flag. The present disclosure can proceed with ffs(S&!D). Using a bit shift, the present disclosure can generate bit masks to set the v_buffer and the d_buffer all the way through, e.g., one bit-wise operation per 32 or 64 bit word. The present disclosure can use the v_buffer for early-z testing in the final pass, i.e., set the depth buffer value to the first cell that is not visible.

Any surface-based visibility approach may have the problem of tiny triangles, i.e., triangles which fall between pixels, which may not generate any pixels. This can lead to these triangles missing from the PVS. With visibility volumes approach herein, the present disclosure can verify in a geometry shader or mesh shader of the final rendering pass whether a triangle's projected area is smaller than a pixel. If so, the present disclosure can query the v_buffer directly at the triangle vertices or the triangle center. If the v_buffer is set, the triangle may be added to the PVS, i.e., identify the triangle as visible.

Figure 11:
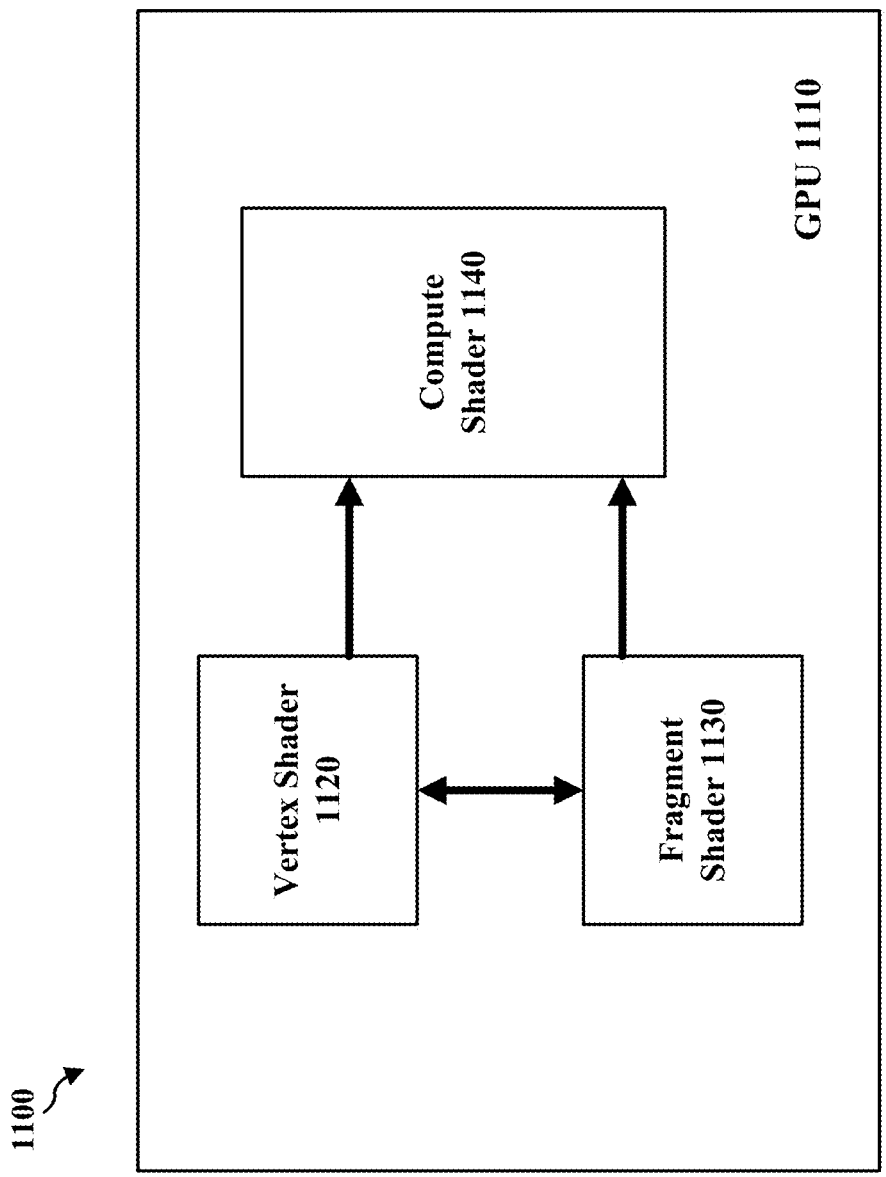
FIG. 11 illustrates an example diagram in accordance with one or more techniques of this disclosure.

FIG. 11 illustrates an example diagram 1100 in accordance with one or more techniques of this disclosure. More specifically, diagram 1100 includes a number of components for the order-independent occlusion computations described herein. As shown in FIG. 11, diagram 1100 includes GPU 1110, vertex shader 1120, fragment shader 1130, and compute shader 1140. As described herein, GPU 1110, vertex shader 1120, fragment shader 1130, and compute shader 1140 can perform a number of different steps or processes to determine visible primitives in order-independent occlusion computations.

FIGS. 6A-11 illustrate examples of the aforementioned processes for order-independent occlusion computations. As shown in FIGS. 6A-11, aspects of the present disclosure, such as GPUs, vertex shaders, fragment shaders, and compute shaders herein, e.g., GPU 1110, vertex shader 1120, fragment shader 1130, and compute shader 1140, can perform a number of different steps or processes to determine visible primitives in order-independent occlusion computations. For instance, GPUs herein can generate a volumetric grid, e.g., volumetric grids 606, 616, 626, based on a viewing area, e.g., viewing areas 604, 614, 624, corresponding to a viewpoint in a scene, e.g., viewpoints 602, 612, 622. In some aspects, the volumetric grid may be associated with a surface buffer corresponding to surface information, e.g., volumetric grid 606, a disocclusion buffer corresponding to disocclusion information, e.g., volumetric grid 616, and a visibility buffer corresponding to visibility information, e.g., volumetric grid 626.

GPUs herein can also generate the surface buffer including a plurality of surface cells, e.g., cells in the volumetric grid 606, the disocclusion buffer including a plurality of disocclusion cells, e.g., cells in the volumetric grid 616, and the visibility buffer including a plurality of visibility cells e.g., cells in the volumetric grid 626. GPUs herein can also determine geometry information for each of a plurality of primitives associated with a viewpoint in a scene, e.g., viewpoints 702, 712, 722.

Moreover, GPUs herein can identify at least one of one or more surface fragments, e.g., surface fragments 708, and one or more silhouette edges, e.g., silhouette edges 718, for each of the plurality of primitives based on the geometry information. In some aspects, the one or more surface fragments may correspond to the surface information, e.g., cells in the volumetric grid 806, and the one or more silhouette edges may correspond to the disocclusion information, e.g., cells in the volumetric grid 816. GPUs herein can also convert the geometry information for each of the plurality of primitives to at least one of the surface information and the disocclusion information. In some instances, the geometry information can be converted based on a domain transformation, where the volumetric grid may correspond to a perspective space based on the viewing area corresponding to the viewpoint.

GPUs herein can also calculate at least one of surface information and disocclusion information based on the geometry information for each of the plurality of primitives, where the surface information and the disocclusion information may be associated with a volumetric grid, e.g., volumetric grids 806 and 816, based on a viewing area, e.g., viewing areas 804 and 814, corresponding to the viewpoint, e.g., viewpoints 802 and 812. Also, GPUs herein can calculate visibility information for each of the plurality of primitives based on at least one of the surface information and the disocclusion information, where the visibility information may be associated with the volumetric grid, e.g., volumetric grid 826.

GPUs herein can also store the surface information in the surface buffer, e.g., corresponding to volumetric grid 906, the disocclusion information in the disocclusion buffer, e.g., corresponding to volumetric grid 916, and the visibility information in the visibility buffer, e.g., corresponding to volumetric grid 926. In some aspects, a bit value for each of the plurality of surface cells may be set to zero (0), a bit value for each of the plurality of disocclusion cells may be set to zero (0), and a bit value for each of the plurality of visibility cells may be set to one (1). Also, a bit value for each of the plurality of surface cells may be zero (0) when the surface cell does not include surface information and a bit value for each of the plurality of disocclusion cells may be zero (0) when the disocclusion cell does not include disocclusion information.

In some aspects, a bit value for each visibility cell can be one (1) when the visibility cell is marked as visible and a bit value for each visibility cell can be zero (0) when the visibility cell is marked as not visible. Additionally, a bit value for each visibility cell may be one (1) when a bit value for at least one corresponding surface cell is zero (0), the at least one corresponding surface cell being closer to the viewpoint than the visibility cell and in a same row of the volumetric grid as the visibility cell. In some instances, a bit value for each visibility cell may be zero (0) when a bit value for at least one corresponding surface cell is one (1), the at least one corresponding surface cell being closer to the viewpoint than the visibility cell and in a same row of the volumetric grid as the visibility cell. Also, a bit value for each visibility cell may be one (1) when a bit value for a corresponding disocclusion cell is one (1).

GPUs herein can also determine whether each of the plurality of primitives is visible based on the visibility information for each of the plurality of primitives. Additionally, GPUs herein can store the visibility information for each of the plurality of primitives determined to be visible, e.g., corresponding to volumetric grid 1026, where the visibility information can be stored as potentially visible set (PVS) information. GPUs herein can also render at least one image including each of the plurality of primitives determined to be visible.

In some aspects, the viewing area, e.g., viewing area 1004, may be defined by a first viewing ray and a second viewing ray from the viewpoint, e.g., viewpoint 1002, where the first viewing ray and the second viewing ray each correspond to an edge of the volumetric grid, e.g., volumetric grid 1006. Moreover, each of the plurality of primitives may be determined to be visible by a vertex shader, e.g., vertex shader 1120, or fragment shader, e.g., fragment shader 1130. Also, the visibility information for each of the plurality of primitives may be calculated by a compute shader, e.g., compute shader 1140.

Figure 12:
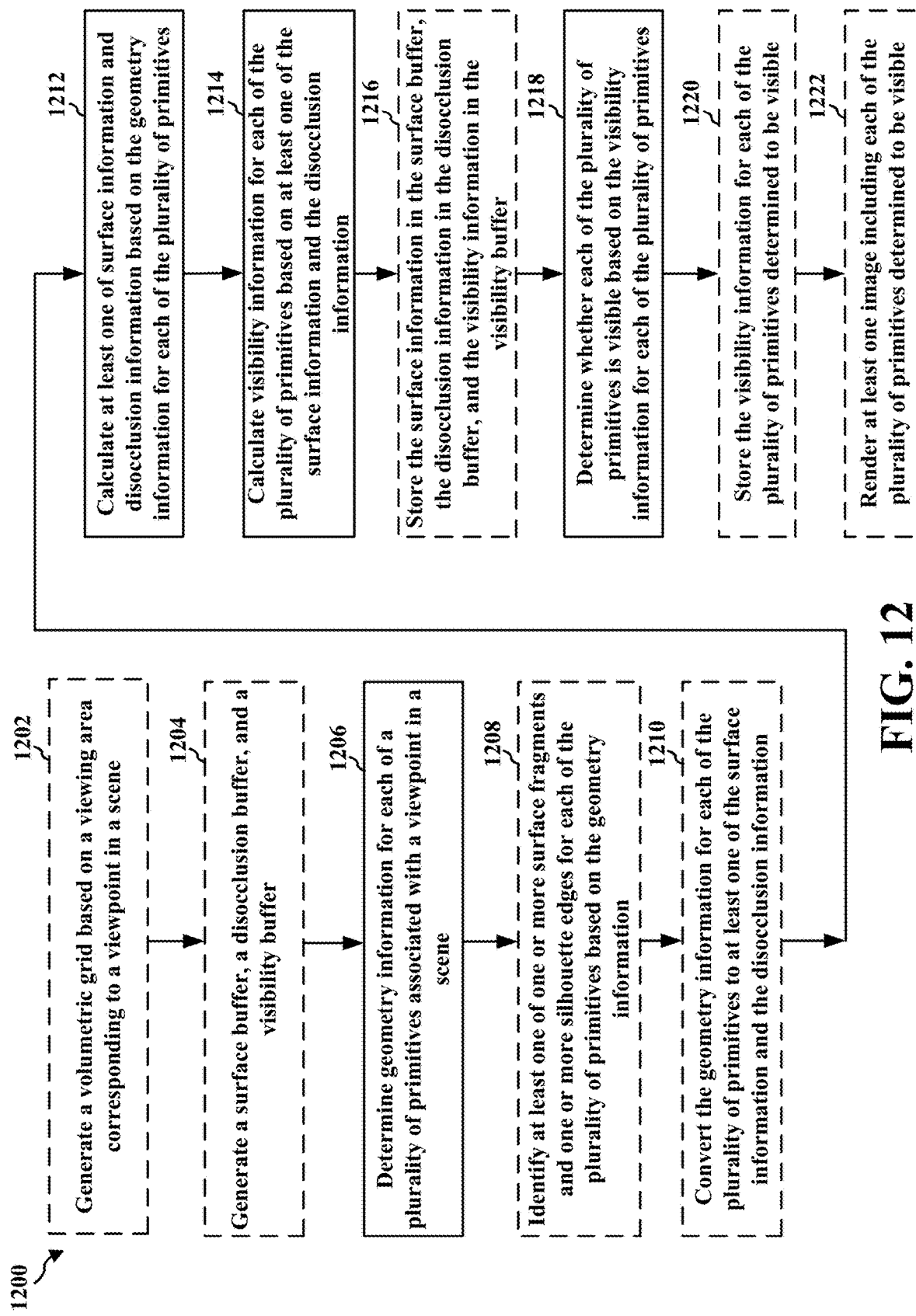
FIG. 12 illustrates an example flowchart of an example method in accordance with one or more techniques of this disclosure.

FIG. 12 illustrates a flowchart 1200 of an example method in accordance with one or more techniques of this disclosure. The method may be performed by an apparatus such as a GPU, a CPU, a vertex shader, a fragment shader, a compute shader, or an apparatus for graphics processing. At 1202, the apparatus may generate a volumetric grid based on a viewing area corresponding to a viewpoint in a scene, as described in connection with the examples in FIGS. 5A-11. In some aspects, the volumetric grid may be associated with a surface buffer corresponding to surface information, a disocclusion buffer corresponding to disocclusion information, and a visibility buffer corresponding to visibility information, as described in connection with the examples in FIGS. 5A-11.

At 1204, the apparatus may generate the surface buffer including a plurality of surface cells, the disocclusion buffer including a plurality of disocclusion cells, and the visibility buffer including a plurality of visibility cells, as described in connection with the examples in FIGS. 5A-11. At 1206, the apparatus may determine geometry information for each of a plurality of primitives associated with a viewpoint in a scene, as described in connection with the examples in FIGS. 5A-11.

At 1208, the apparatus may identify at least one of one or more surface fragments and one or more silhouette edges for each of the plurality of primitives based on the geometry information, as described in connection with the examples in FIGS. 5A-11. In some aspects, the one or more surface fragments may correspond to the surface information and the one or more silhouette edges may correspond to the disocclusion information, as described in connection with the examples in FIGS. 5A-11.

At 1210, the apparatus may convert the geometry information for each of the plurality of primitives to at least one of the surface information and the disocclusion information, as described in connection with the examples in FIGS. 5A-11. In some instances, the geometry information can be converted based on a domain transformation, where the volumetric grid may correspond to a perspective space based on the viewing area corresponding to the viewpoint, as described in connection with the examples in FIGS. 5A-11.

At 1212, the apparatus may calculate at least one of surface information and disocclusion information based on the geometry information for each of the plurality of primitives, where the surface information and the disocclusion information may be associated with a volumetric grid based on a viewing area corresponding to the viewpoint, as described in connection with the examples in FIGS. 5A-11. At 1214, the apparatus may calculate visibility information for each of the plurality of primitives based on at least one of the surface information and the disocclusion information, where the visibility information may be associated with the volumetric grid, as described in connection with the examples in FIGS. 5A-11.

At 1216, the apparatus may store the surface information in the surface buffer, the disocclusion information in the disocclusion buffer, and the visibility information in the visibility buffer, as described in connection with the examples in FIGS. 5A-11. In some aspects, a bit value for each of the plurality of surface cells may be set to zero (0), a bit value for each of the plurality of disocclusion cells may be set to zero (0), and a bit value for each of the plurality of visibility cells may be set to one (1), as described in connection with the examples in FIGS. 5A-11. Also, a bit value for each of the plurality of surface cells may be zero (0) when the surface cell does not include surface information and a bit value for each of the plurality of disocclusion cells may be zero (0) when the disocclusion cell does not include disocclusion information, as described in connection with the examples in FIGS. 5A-11.

In some aspects, a bit value for each visibility cell can be one (1) when the visibility cell is marked as visible and a bit value for each visibility cell can be zero (0) when the visibility cell is marked as not visible, as described in connection with the examples in FIGS. 5A-11. Additionally, a bit value for each visibility cell may be one (1) when a bit value for at least one corresponding surface cell is zero (0), the at least one corresponding surface cell being closer to the viewpoint than the visibility cell and in a same row of the volumetric grid as the visibility cell, as described in connection with the examples in FIGS. 5A-11. In some instances, a bit value for each visibility cell may be zero (0) when a bit value for at least one corresponding surface cell is one (1), the at least one corresponding surface cell being closer to the viewpoint than the visibility cell and in a same row of the volumetric grid as the visibility cell, as described in connection with the examples in FIGS. 5A-11. Also, a bit value for each visibility cell may be one (1) when a bit value for a corresponding disocclusion cell is one (1), as described in connection with the examples in FIGS. 5A-11.

At 1218, the apparatus may determine whether each of the plurality of primitives is visible based on the visibility information for each of the plurality of primitives, as described in connection with the examples in FIGS. 5A-11. At 1220, the apparatus may store the visibility information for each of the plurality of primitives determined to be visible, where the visibility information may be stored as potentially visible set (PVS) information, as described in connection with the examples in FIGS. 5A-11. At 1222, the apparatus may render at least one image including each of the plurality of primitives determined to be visible, as described in connection with the examples in FIGS. 5A-11.

In some aspects, the viewing area may be defined by a first viewing ray and a second viewing ray from the viewpoint, where the first viewing ray and the second viewing ray each correspond to an edge of the volumetric grid, as described in connection with the examples in FIGS. 5A-11. Moreover, each of the plurality of primitives may be determined to be visible by a vertex shader or fragment shader, as described in connection with the examples in FIGS. 5A-11. Also, the visibility information for each of the plurality of primitives may be calculated by a compute shader, as described in connection with the examples in FIGS. 5A-11.

In one configuration, a method or apparatus for graphics processing is provided. The apparatus may be a CPU, a GPU, or some other processor that can perform graphics processing. In one aspect, the apparatus may be the processing unit 120 within the device 104, or may be some other hardware within device 104 or another device. The apparatus may include means for determining geometry information for each of a plurality of primitives associated with a viewpoint in a scene. The apparatus may also include means for calculating at least one of surface information and disocclusion information based on the geometry information for each of the plurality of primitives, where the surface information and the disocclusion information are associated with a volumetric grid based on a viewing area corresponding to the viewpoint. The apparatus may also include means for calculating visibility information for each of the plurality of primitives based on at least one of the surface information and the disocclusion information, where the visibility information is associated with the volumetric grid. The apparatus may also include means for determining whether each of the plurality of primitives is visible based on the visibility information for each of the plurality of primitives. The apparatus may also include means for identifying at least one of one or more surface fragments and one or more silhouette edges for each of the plurality of primitives based on the geometry information. The apparatus may also include means for converting the geometry information for each of the plurality of primitives to at least one of the surface information and the disocclusion information. The apparatus may also include means for generating the volumetric grid based on the viewing area corresponding to the viewpoint, where the volumetric grid is associated with a surface buffer corresponding to the surface information, a disocclusion buffer corresponding to the disocclusion information, and a visibility buffer corresponding to the visibility information. The apparatus may also include means for generating the surface buffer including a plurality of surface cells, the disocclusion buffer including a plurality of disocclusion cells, and the visibility buffer including a plurality of visibility cells. The apparatus may also include means for storing the surface information in the surface buffer, the disocclusion information in the disocclusion buffer, and the visibility information in the visibility buffer. The apparatus may also include means for storing the visibility information for each of the plurality of primitives determined to be visible, where the visibility information is stored as potentially visible set (PVS) information. The apparatus may also include means for rendering at least one image including each of the plurality of primitives determined to be visible.

The subject matter described herein can be implemented to realize one or more benefits or advantages. For instance, the described graphics processing techniques can be used by a GPU, a CPU, or some other processor that can perform graphics processing to implement the order-independent occlusion computations described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can reduce the amount of data or memory bandwidth when determining visible primitives in order-independent occlusion computations.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, comprising:
generating a volumetric grid based on a viewing area corresponding to a viewpoint in a scene;
determining geometry information for each of a plurality of primitives associated with the viewpoint in the scene;
calculating at least one of surface information and disocclusion information based on the geometry information for each of the plurality of primitives, wherein the surface information and the disocclusion information are associated with the volumetric grid based on the viewing area corresponding to the viewpoint, wherein the volumetric grid is associated with a surface buffer corresponding to the surface information and a disocclusion buffer corresponding to the disocclusion information, wherein the surface buffer includes a plurality of surface cells and the disocclusion buffer includes a plurality of disocclusion cells;

calculating visibility information for each of the plurality of primitives based on at least one of the surface information and the disocclusion information, wherein the visibility information is associated with the volumetric grid, wherein the volumetric grid is associated with a visibility buffer corresponding to the visibility information, wherein the visibility buffer includes a plurality of visibility cells;

storing the surface information in the surface buffer, the disocclusion information in the disocclusion buffer, and the visibility information in the visibility buffer; and determining whether each of the plurality of primitives is visible based on the visibility information for each of the plurality of primitives.

2. The method of claim 1, further comprising:
identifying at least one of one or more surface fragments and one or more silhouette edges for each of the plurality of primitives based on the geometry information.

3. The method of claim 2, wherein the one or more surface fragments correspond to the surface information and the one or more silhouette edges correspond to the disocclusion information.

4. The method of claim 1, further comprising:
converting the geometry information for each of the plurality of primitives to at least one of the surface information and the disocclusion information.

5. The method of claim 4, wherein the geometry information is converted based on a domain transformation, wherein the volumetric grid corresponds to a perspective space based on the viewing area corresponding to the viewpoint.

6. The method of claim 1, further comprising:
generating the surface buffer including the plurality of surface cells, the disocclusion buffer including the plurality of disocclusion cells, and the visibility buffer including the plurality of visibility cells.

7. The method of claim 6, wherein a bit value for each of the plurality of surface cells is set to zero (0), a bit value for each of the plurality of disocclusion cells is set to zero (0), and a bit value for each of the plurality of visibility cells is set to one (1).

8. The method of claim 1, wherein a bit value for each of the plurality of surface cells is zero (0) when the surface cell does not include the surface information and a bit value for each of the plurality of disocclusion cells is zero (0) when the disocclusion cell does not include the disocclusion information.

9. The method of claim 1, wherein a bit value for each visibility cell is one (1) when the visibility cell is marked as visible and the bit value for each visibility cell is zero (0) when the visibility cell is marked as not visible.

10. The method of claim 1, wherein a bit value for each visibility cell is one (1) when a bit value for at least one corresponding surface cell is zero (0), the at least one corresponding surface cell being closer to the viewpoint than the visibility cell and in a same row of the volumetric grid as the visibility cell.

11. The method of claim 1, wherein a bit value for each visibility cell is zero (0) when a bit value for at least one corresponding surface cell is one (1), the at least one corresponding surface cell being closer to the viewpoint than the visibility cell and in a same row of the volumetric grid as the visibility cell.

12. The method of claim 1, wherein a bit value for each visibility cell is one (1) when a bit value for a corresponding disocclusion cell is one (1).

13. The method of claim 1, further comprising:
storing the visibility information for each of the plurality of primitives determined to be visible, wherein the visibility information is stored as potentially visible set (PVS) information.

14. The method of claim 13, further comprising:
rendering at least one image including each of the plurality of primitives determined to be visible.

15. The method of claim 1, wherein the viewing area is defined by a first viewing ray and a second viewing ray from the viewpoint, wherein the first viewing ray and the second viewing ray each correspond to an edge of the volumetric grid.

16. The method of claim 1, wherein each of the plurality of primitives is determined to be visible by a vertex shader or fragment shader.

17. The method of claim 1, wherein the visibility information for each of the plurality of primitives is calculated by a compute shader.

18. An apparatus for graphics processing, comprising:
a memory; and
at least one processor coupled to the memory and configured to:
generate a volumetric grid based on a viewing area corresponding to a viewpoint in a scene;
determine geometry information for each of a plurality of primitives associated with the viewpoint in the scene;
calculate at least one of surface information and disocclusion information based on the geometry information for each of the plurality of primitives, wherein the surface information and the disocclusion information are associated with the volumetric grid based on the viewing area corresponding to the viewpoint, wherein the volumetric grid is associated with a surface buffer corresponding to the surface information and a disocclusion buffer corresponding to the disocclusion information, wherein the surface buffer includes a plurality of surface cells and the disocclusion buffer includes a plurality of disocclusion cells;
calculate visibility information for each of the plurality of primitives based on at least one of the surface information and the disocclusion information, wherein the visibility information is associated with the volumetric grid, wherein the volumetric grid is associated with a visibility buffer corresponding to the visibility information, wherein the visibility buffer includes a plurality of visibility cells;
store the surface information in the surface buffer, the disocclusion information in the disocclusion buffer, and the visibility information in the visibility buffer; and
determine whether each of the plurality of primitives is visible based on the visibility information for each of the plurality of primitives.

19. The apparatus of claim 18, wherein the at least one processor is further configured to:
identify at least one of one or more surface fragments and one or more silhouette edges for each of the plurality of primitives based on the geometry information.

20. The apparatus of claim 19, wherein the one or more surface fragments correspond to the surface information and the one or more silhouette edges correspond to the disocclusion information.

21. The apparatus of claim 18, wherein the at least one processor is further configured to:
convert the geometry information for each of the plurality of primitives to at least one of the surface information and the disocclusion information.

22. The apparatus of claim 21, wherein the geometry information is converted based on a domain transformation, wherein the volumetric grid corresponds to a perspective space based on the viewing area corresponding to the viewpoint.

23. The apparatus of claim 18, wherein the at least one processor is further configured to:
generate the surface buffer including the plurality of surface cells, the disocclusion buffer including the plurality of disocclusion cells, and the visibility buffer including the plurality of visibility cells.

24. The apparatus of claim 23, wherein a bit value for each of the plurality of surface cells is set to zero (0), a bit value for each of the plurality of disocclusion cells is set to zero (0), and a bit value for each of the plurality of visibility cells is set to one (1).

25. The apparatus of claim 18, wherein a bit value for each of the plurality of surface cells is zero (0) when the surface cell does not include the surface information and a bit value for each of the plurality of disocclusion cells is zero (0) when the disocclusion cell does not include the disocclusion information.

26. The apparatus of claim 18, wherein a bit value for each visibility cell is one (1) when the visibility cell is marked as visible and the bit value for each visibility cell is zero (0) when the visibility cell is marked as not visible.

27. The apparatus of claim 18, wherein a bit value for each visibility cell is one (1) when a bit value for at least one corresponding surface cell is zero (0), the at least one corresponding surface cell being closer to the viewpoint than the visibility cell and in a same row of the volumetric grid as the visibility cell.

28. The apparatus of claim 18, wherein a bit value for each visibility cell is zero (0) when a bit value for at least one corresponding surface cell is one (1), the at least one corresponding surface cell being closer to the viewpoint than the visibility cell and in a same row of the volumetric grid as the visibility cell.

29. The apparatus of claim 18, wherein a bit value for each visibility cell is one (1) when a bit value for a corresponding disocclusion cell is one (1).

30. The apparatus of claim 18, wherein the at least one processor is further configured to:
store the visibility information for each of the plurality of primitives determined to be visible, wherein the visibility information is stored as potentially visible set (PVS) information.

31. The apparatus of claim 30, wherein the at least one processor is further configured to:
render at least one image including each of the plurality of primitives determined to be visible.

32. The apparatus of claim 18, wherein the viewing area is defined by a first viewing ray and a second viewing ray from the viewpoint, wherein the first viewing ray and the second viewing ray each correspond to an edge of the volumetric grid.

33. The apparatus of claim 18, wherein each of the plurality of primitives is determined to be visible by a vertex shader or fragment shader.

34. The apparatus of claim 18, wherein the visibility information for each of the plurality of primitives is calculated by a compute shader.

35. An apparatus for graphics processing, comprising:
means for generating a volumetric grid based on a viewing area corresponding to a viewpoint in a scene;
means for determining geometry information for each of a plurality of primitives associated with the viewpoint in the scene;
means for calculating at least one of surface information and disocclusion information based on the geometry information for each of the plurality of primitives, wherein the surface information and the disocclusion information are associated with the volumetric grid based on the viewing area corresponding to the viewpoint, wherein the volumetric grid is associated with a surface buffer corresponding to the surface information and a disocclusion buffer corresponding to the disocclusion information, wherein the surface buffer includes a plurality of surface cells and the disocclusion buffer includes a plurality of disocclusion cells;
means for calculating visibility information for each of the plurality of primitives based on at least one of the surface information and the disocclusion information, wherein the visibility information is associated with the volumetric grid, wherein the volumetric grid is associated with a visibility buffer corresponding to the visibility information, wherein the visibility buffer includes a plurality of visibility cells;
means for storing the surface information in the surface buffer, the disocclusion information in the disocclusion buffer, and the visibility information in the visibility buffer; and
means for determining whether each of the plurality of primitives is visible based on the visibility information for each of the plurality of primitives.

36. A non-transitory computer-readable medium storing computer executable code for graphics processing, the code when executed by a processor causes the processor to:
generate a volumetric grid based on a viewing area corresponding to a viewpoint in a scene;
determine geometry information for each of a plurality of primitives associated with the viewpoint in the scene;
calculate at least one of surface information and disocclusion information based on the geometry information for each of the plurality of primitives, wherein the surface information and the disocclusion information are associated with the volumetric grid based on the viewing area corresponding to the viewpoint, wherein the volumetric grid is associated with a surface buffer corresponding to the surface information and a disocclusion buffer corresponding to the disocclusion information, wherein the surface buffer includes a plurality of surface cells and the disocclusion buffer includes a plurality of disocclusion cells;
calculate visibility information for each of the plurality of primitives based on at least one of the surface information and the disocclusion information, wherein the visibility information is associated with the volumetric grid, wherein the volumetric grid is associated with a visibility buffer corresponding to the visibility information, wherein the visibility buffer includes a plurality of visibility cells;

store the surface information in the surface buffer, the disocclusion information in the disocclusion buffer, and the visibility information in the visibility buffer; and
determine whether each of the plurality of primitives is visible based on the visibility information for each of the plurality of primitives.

\* \* \* \* \*